US012793226B2

(12) United States Patent
Yang et al.

(10) Patent No.: US 12,793,226 B2
(45) Date of Patent: Nov. 10, 2026

(54) FABRIC IMAGE PROCESSING DEVICE AND METHOD

(71) Applicant: NunoX Technologies Co., Ltd., Taipei City (TW)

(72) Inventors: Sing-Heng Yang, Taipei City (TW); Meng-Shiuan Hsieh, Taipei City (TW)

(73) Assignee: NunoX Technologies Co., Ltd., Taipei City (TW)

( * ) Notice: Subject to any disclaimer, the term of this patent is extended or adjusted under 35 U.S.C. 154(b) by 370 days.

(21) Appl. No.: 18/666,843

(22) Filed: May 17, 2024

(65) Prior Publication Data

US 2024/0386573 A1 Nov. 21, 2024

(30) Foreign Application Priority Data

May 19, 2023 (TW) ................................ 112118822

(51) Int. Cl.
*G06T 7/11* (2017.01)

(52) U.S. Cl.
CPC ...... *G06T 7/11* (2017.01); *G06T 2207/20081* (2013.01); *G06T 2207/20084* (2013.01)

(58) Field of Classification Search
CPC ............. G06T 7/11; G06T 2207/20081; G06T 2207/20084; G06T 2207/30124; G06T 2210/16; G06T 9/002; G06T 5/60; G06T 7/55; G06T 7/10; G06T 7/136; G06T 7/194; G06V 10/82; G06V 10/766; G06V 10/70;

(Continued)

(56) References Cited

U.S. PATENT DOCUMENTS 10,064,270 B2 8/2018 Jur et al.
10,733,755 B2 * 8/2020 Liao ........................ G06F 18/22

(Continued)

FOREIGN PATENT DOCUMENTS

CN 108026677 A 5/2018
CN 109477824 A 3/2019

(Continued)

OTHER PUBLICATIONS

Jacob Devlin, et al., "BERT: Pre-training of Deep Bidirectional Transformers for Language Understanding", Computation and Language (cs.CL), 2019, pp. 4171-4186.

*Primary Examiner* — Atiba O Fitzpatrick
(74) *Attorney, Agent, or Firm* — CKC & Partners Co., LLC

(57) ABSTRACT

A fabric image processing device is provided. The device performs a matting algorithm on the top view image and the side view image to generate a top view silhouette image and a side view silhouette image. The device updates the first neural network model and the first linear regression model according to the top view silhouette image and a physical deformation parameter, and updates the second neural network model and the second linear regression model according to the side view silhouette image and the physical deformation parameter. The device inputs the top view silhouette image and the side view silhouette image to the first neural network model and the second neural network model to generate output vectors. The device concatenates output vectors to generate a concatenated vector, and updates the third linear regression model according to the concatenated vector and the physical deformation parameter.

20 Claims, 9 Drawing Sheets

(58) Field of Classification Search
CPC ..... G06V 10/774–7796; G06V 10/454; G06V 10/25; G06V 10/87; G06V 30/19113; G06N 3/045; G06N 3/0464; G06N 3/084; G06N 3/02–126; G06N 20/00–20; G06N 20/20; G06F 2113/12; G06F 18/214–2155; G06F 7/023; G06F 40/16; G06K 9/6256; G06K 9/6257; G06K 9/6259; G01N 29/4481
See application file for complete search history.

(56) References Cited

U.S. PATENT DOCUMENTS

| | | | | |
|---|---|---|---|---|
| 10,846,836 | B2 * | 11/2020 | Kwon | G06N 3/0455 |
| 11,158,121 | B1 * | 10/2021 | Tung | G06F 17/18 |
| 11,423,630 | B1 * | 8/2022 | Agrawal | G06T 7/55 |
| 11,816,185 | B1 * | 11/2023 | Roth | G06N 3/08 |
| 11,854,146 | B1 * | 12/2023 | Smith | G06V 20/647 |
| 11,861,860 | B2 * | 1/2024 | Agrawal | G06T 17/20 |
| 11,887,252 | B1 * | 1/2024 | Chandra | G06F 18/214 |
| 11,903,730 | B1 * | 2/2024 | Chaudhri | G06N 3/0464 |
| 12,165,271 | B1 * | 12/2024 | Agrawal | G06T 15/04 |
| 12,594,030 | B1 * | 4/2026 | Smith | A61B 5/4872 |
| 2018/0240280 | A1 * | 8/2018 | Chen | G06T 19/20 |
| 2018/0322623 | A1 * | 11/2018 | Memo | G06N 3/045 |
| 2019/0026917 | A1 * | 1/2019 | Liao | G06F 18/22 |
| 2020/0065955 | A1 * | 2/2020 | Garlapati | G06F 18/22 |
| 2020/0320769 | A1 * | 10/2020 | Chen | G06N 3/0464 |
| 2021/0158511 | A1 * | 5/2021 | Guo | A61B 5/0044 |
| 2022/0076405 | A1 * | 3/2022 | Choi | G06T 19/20 |
| 2022/0279183 | A1 * | 9/2022 | Besenbruch | G06N 3/045 |
| 2023/0123820 | A1 * | 4/2023 | Wang | G06N 3/088 345/474 |
| 2024/0087274 | A1 * | 3/2024 | Ju | G06F 3/04847 |
| 2024/0257330 | A1 * | 8/2024 | Ju | G06F 30/27 |
| 2024/0331251 | A1 * | 10/2024 | Santesteban Garay | G06T 13/20 |
| 2025/0045499 | A1 * | 2/2025 | Liu | G06N 3/08 |

FOREIGN PATENT DOCUMENTS

| | | | |
|---|---|---|---|
| CN | 110412037 | A | 11/2019 |
| CN | 113686804 | A | 11/2021 |
| CN | 110069860 | B | 6/2022 |
| CN | 115406852 | A | 11/2022 |
| TW | 201243119 | A | 11/2012 |
| TW | 202139972 | A | 11/2021 |
| WO | 2019162547 | A1 | 8/2019 |

* cited by examiner

FABRIC IMAGE PROCESSING DEVICE AND METHOD

CROSS-REFERENCE TO RELATED APPLICATIONS

This application claims priority to Taiwan Application Serial Number 112118822, filed on May 19, 2023, which is herein incorporated by reference in its entirety.

BACKGROUND

Technical Field

The present disclosure relates to a fabric image processing device and method.

Description of Related Art

In present textile technologies, the technique of simulating a virtual fabric (or cloth) in a three-dimensional space is often adopted, so as to observe drapes and motions of the virtual fabric in the three-dimensional space. This may usually require measuring physical deformation parameters (e.g., bending works in the warp/weft direction, stretch rates in the warp/weft/oblique direction) of the fabric, so as to perform further simulations. However, it may take a long time and a large amount of manpower to measure physical deformation parameters of the fabric, where specific testing machines may also be required. Therefore, to get physical deformation parameters of the fabric without measuring them is a problem that people with ordinary skills in the art want to resolve.

SUMMARY

The present disclosure provides a fabric image processing device, comprising an image capturing circuit, a memory and a processor. The image capturing circuit is configured to capture a first top view image and a first side view image of a first fabric. The memory is configured to store a first physical deformation parameter corresponding to the first fabric. The processor is coupled to the image capturing circuit and the memory, and is configured to execute a first neural network model, a second neural network model, a first linear regression model, a second linear regression model, and a third linear regression model. The processor is configured to execute the following operations: performing a matting algorithm on the first top view image and the first side view image, respectively, so as to generate a first top view silhouette image and a first side view silhouette image; updating the first neural network model and the first linear regression model according to the first top view silhouette image and the corresponding first physical deformation parameter, and updating the second neural network model and the second linear regression model according to the first side view silhouette image and the corresponding first physical deformation parameter; inputting the first top view silhouette image and the first side view silhouette image to the first neural network model and the second neural network model, respectively, so as to generate a first output vector and a second output vector; and concatenating the first output vector and the second output vector to generate a concatenated vector, and updating the third linear regression model according to the concatenated vector and the corresponding first physical deformation parameter.

The present disclosure provides a fabric image processing method, comprising: capturing a first top view image and a first side view image of a first fabric, and performing a matting algorithm on the first top view image and the first side view image, respectively, so as to generate a first top view silhouette image and a first side view silhouette image; updating a first neural network model and a first linear regression model according to the first top view silhouette image and a corresponding first physical deformation parameter, and updating a second neural network model and a second linear regression model according to the first side view silhouette image and the corresponding first physical deformation parameter; inputting the first top view silhouette image and the first side view silhouette image to the first neural network model and the second neural network model, respectively, so as to generate a first output vector and a second output vector; and concatenating the first output vector and the second output vector to generate a concatenated vector, and updating a third linear regression model according to the concatenated vector and the corresponding first physical deformation parameter.

It is to be understood that both the foregoing general description and the following detailed description are by examples, and are intended to provide further explanation of the disclosure as claimed.

DETAILED DESCRIPTION

Figure 1A:
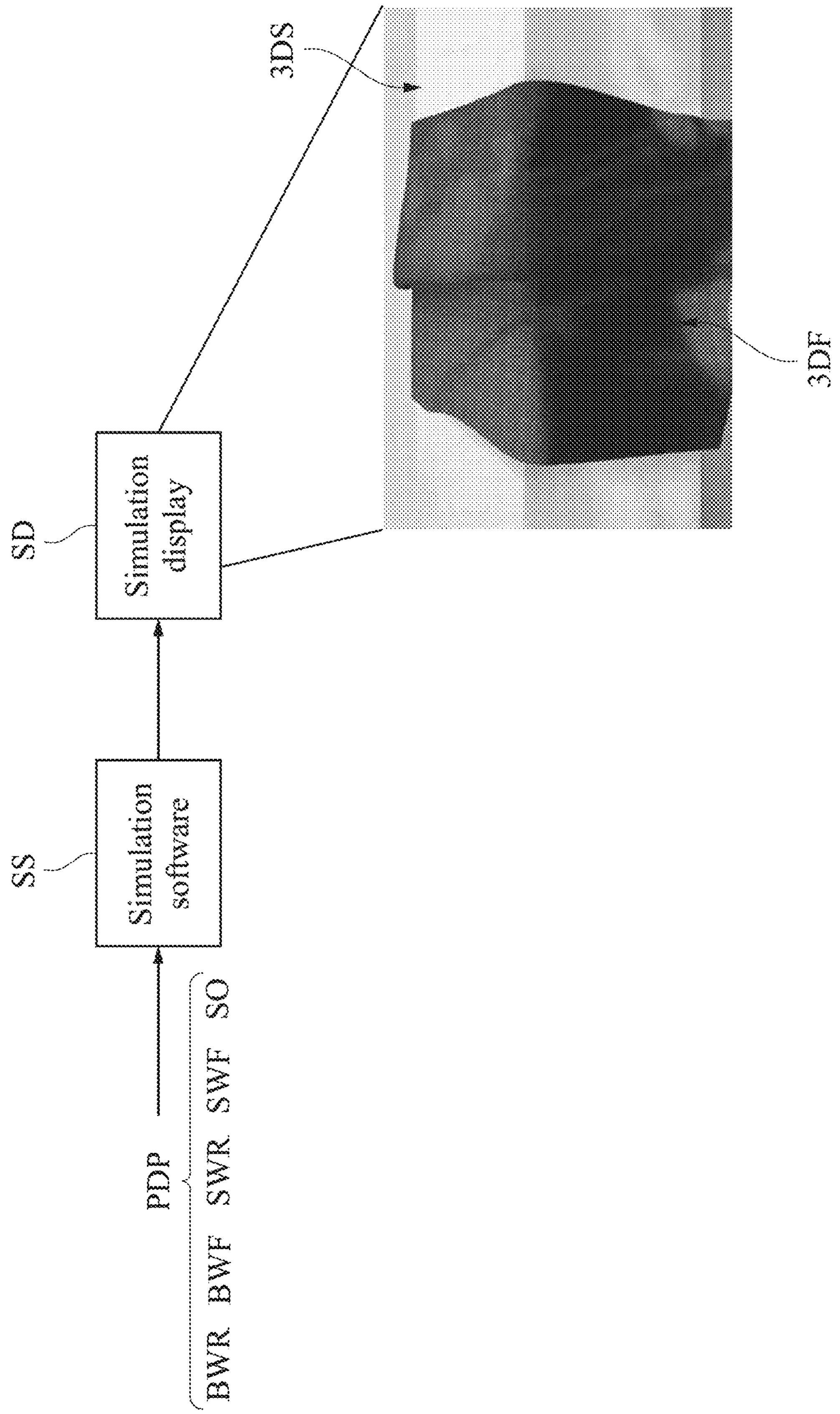
FIG. 1A is a schematic diagram of simulating a piece of real fabric in present textile technologies.

Reference will now be made in detail to the present embodiments of the disclosure, examples of which are illustrated in the accompanying drawings. Wherever possible, the same reference numbers are used in the drawings and the description to refer to the same or like parts.

Refer to FIG. 1A, where FIG. 1A is a schematic diagram of simulating a piece of real fabric in present textile technologies. In order to provide a realistic fabric simulation, physical deformation parameters PDP corresponding to the fabric (e.g., a piece of fabric or a piece of clothing) are often required. Through a simulation software SS (e.g., three-dimensional simulation software such as Scanatic™ DC Suite), a virtual three-dimensional space 3DS may be generated and simulate various drapes and motions of a virtual fabric 3DF in the virtual three-dimensional space 3DS according to physical deformation parameters PDP. Consequently, a simulation display SD (e.g., a monitor, a touch display or a head-mounted display) may display various drapes and motions of a virtual fabric 3DF in the virtual three-dimensional space 3DS.

In general, a complicated process may be required to measure physical deformation parameters PDP of the fabric, where the physical deformation parameters PDP may include a bending work in the warp direction BWR, a bending work in the weft direction BWF, a stretch rate in the warp direction SWR, a stretch rate in the weft direction SWF and a stretch rate in the oblique direction SO.

More specifically, the bending work in the warp direction BWR is a work required for bending the fabric against/along the warp direction, and a unit of the bending work in the warp direction BWR is a product of a gram-force, a bending length and a bending angle (gf×mm×rad). The bending work in the weft direction BWF is a work required for bending the fabric against/along the weft direction, and the unit of bending work in the weft direction BWF is also the product of the gram-force, the bending length and the bending angle.

In addition, the stretch rate in the warp direction SWR is defined according to a strip method of a breaking strength in the CNS 12915 L3233-2010 standard, which is a measurement of a stretch rate while stretching the fiber in a constant speed CRE with a fixed weight of 500 gw of load along the warp direction of the fiber, and the unit of the stretch rate in the warp direction SWR is percentage (%). The stretch rate in the weft direction SWF is defined according to the strip method of the breaking strength in the CNS 12915 L3233-2010 standard as a stretch rate while stretching the fiber in a constant speed CRE with a fixed weight of 500 gw of load along the weft direction of the fiber, and the unit of the stretch rate in the weft direction SWF is percentage (%). The stretch rate in the oblique direction SO is defined according to the strip method of the breaking strength in the CNS 12915 L3233-2010 standard as a stretch rate while stretching the fiber in a constant speed CRE with a fixed weight of 500 gw of load along the oblique direction (the direction with an angle of 45 degrees to the weft direction) of the fiber, and the unit of the stretch rate in the oblique direction SO is percentage (%). In other words, each of the bending work in the warp direction BWR, the bending work in the weft direction BWF, the stretch rate in the warp direction SWR, the stretch rate in the weft direction SWF and the stretch rate in the oblique direction SO is a numerical data, respectively.

The aforementioned stretch rate in the warp direction SWR, stretch rate in the weft direction SWF and stretch rate in the oblique direction SO may all be computed as Formula 1.

$$\left(\frac{\text{stretching displacement} - \text{clamping distance}}{\text{clamping distance}}\right) \times 100\% \qquad \text{Formula 1}$$

In formula 1, the clamping distance is a distance between two clamping positions on the fabric, and the stretching displacement is a stretching length of the fabric under a fixed weight of 500 g of load.

However, it may be known from above that since physical deformation parameters PDP such as the bending work in the warp direction BWR, the bending work in the weft direction BWF, the stretch rate in the warp direction SWR, the stretch rate in the weft direction SWF and the stretch rate in the oblique direction SO may only be measured by applying a constant force on the fabric and then measuring a variety of quantities of deformation of the fabric. As a result, the whole measuring process becomes complicated and lengthy.

Currently, the measuring process of physical deformation parameters PDP on an ordinary fabric simulation device is complicated and lengthy. As a consequence, the efficiency of the simulation is poor. To overcome the aforementioned problems, the present disclosure provides a fabric detection technology, where a top view image and a side view image corresponding to a fabric are transformed into a top view silhouette image and a side view silhouette image, and then neural network (NN) models and the linear regression models are trained through the top view silhouette image, the side view silhouette image, and the pre-measured physical deformation parameter PDP corresponding to the fabric.

As a result, if a new fabric is to be simulated, a new side view image and a new top view image corresponding to a new fabric may be acquired beforehand, so as to transform the new side view image and the new top view image into a new top view silhouette image and a new side view silhouette image, and thereby utilize the trained neural network model and the trained linear regression model to transform the new top view silhouette image and the new side view silhouette image into a new physical deformation parameter.

Therefore, through the aforementioned detection method, various drapes and motions of a new virtual fabric in the three-dimensional space 3DS may be simulated according to new physical deformation parameters. For a new fabric, a new physical deformation parameter may be recognized rapidly through a new top view silhouette image and a new side view silhouette image, so as to simulate the new fabric without the complicated and lengthy measurement of the new physical deformation parameter. The aforementioned technology of the present disclosure may be specified by following embodiments.

Figure 1B:
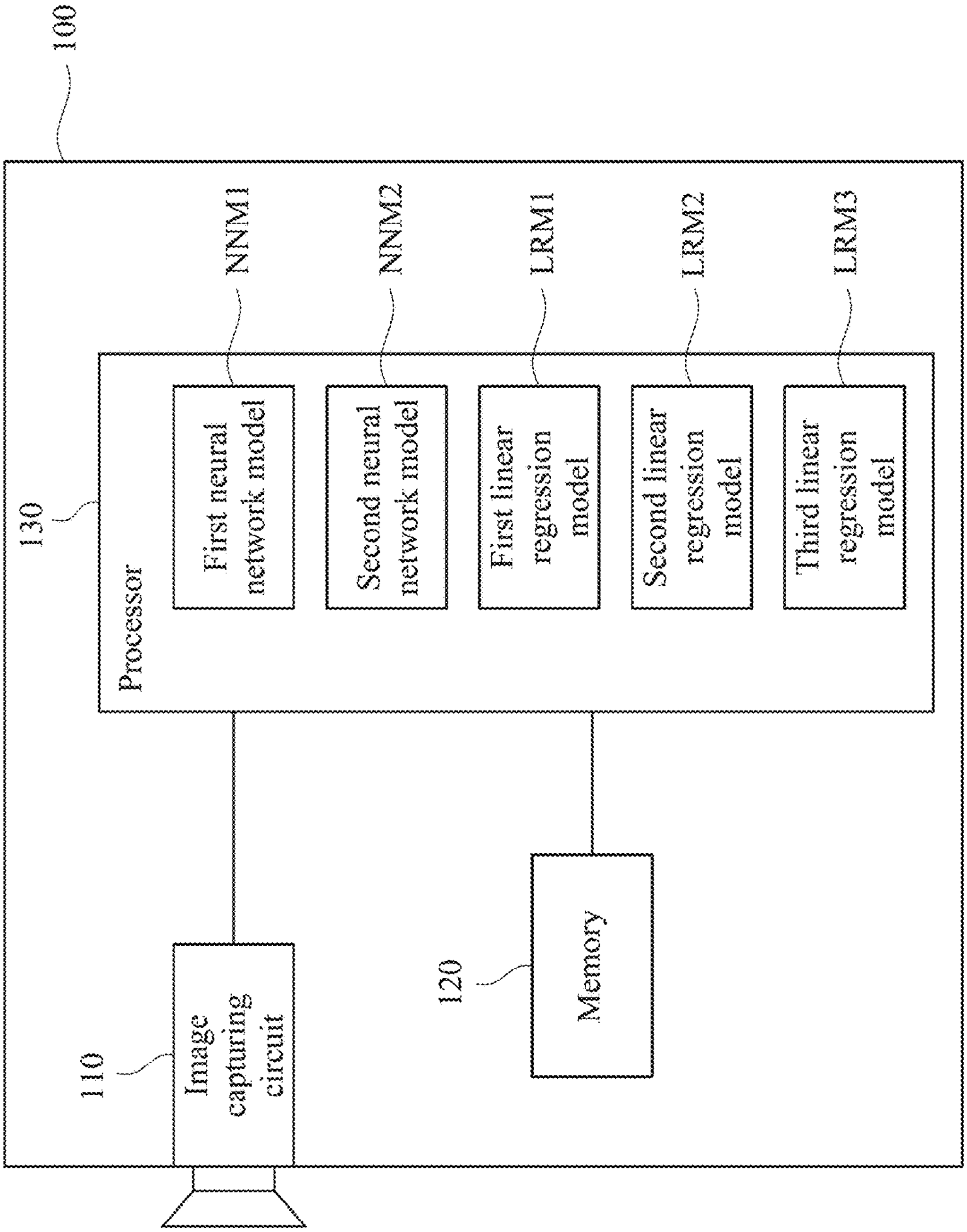
FIG. 1B is a schematic diagram of a fabric image processing device according to some embodiments of the present disclosure.

Refer also to FIG. 1B, where FIG. 1B is a schematic diagram of a fabric image processing device 100 according to some embodiments of the present disclosure. As shown in FIG. 1B, in the present embodiment, the fabric image processing device 100 comprises an image capturing circuit 110, a memory 120, and a processor 130. The processor 130 is coupled to the image capturing circuit 110 and the memory 120.

In some embodiments, the fabric image processing device 100 may be implemented with a computer, a server, or a processing center, etc. In some embodiments, the image capturing circuit 110 may be a photographic circuit (e.g., digital single-lens reflex camera (DSLR), digital video camera (DVC), or near-infrared camera (NIRC)) configured to shoot pictures of a fabric (e.g., a piece of cloth). In some embodiments, the memory 120 may be implemented with a memory unit, a flash memory, a read-only memory (ROM), a hard-disk drive (HDD) or any other equivalent storage devices. In some embodiments, the processor 130 may be implemented with a processing unit, a central processing unit (CPU), or a computing unit.

In the present embodiment, the memory 120 stores a physical deformation parameter corresponding to a fabric beforehand. In some embodiments, a detector machine (e.g., a machine configured to measure deformations (bending and extending) of the fabric) may be utilized to perform extending and bending tests on the fabric, so as to generate the physical deformation parameter, and the detector machine may send the physical deformation parameter corresponding to the fabric directly to the memory 120 to store the physical deformation parameter. It is worth mentioning that while only one physical deformation parameter corresponding to a fabric is taken as an example therein, in practical implementations, the memory 120 may further store a plurality of physical deformation parameters corresponding to a plurality of fabrics.

In the present embodiment, as shown in FIG. 1B, the processor 130 executes a first neural network model NNM1, a second neural network model NNM2, a first linear regression model LRM1, a second linear regression model LRM2, and a third linear regression model LRM3 based on corresponding software and or firmware processes. In some embodiments, the first neural network model NNM1 and the second neural network model NNM2 may both be configured to perform a convolutional neural network (CNN) algorithm. In some embodiments, the first neural network model NNM1 and the second neural network model NNM2 may both comprise a plurality of convolutional layers.

In some embodiments, the first linear regression model LRM1, the second linear regression model LRM2, and the third linear regression model LRM3 may all be regression output layers. In some embodiments, the memory 120 may be configured to store parameters corresponding to the first neural network model NNM1, the second neural network model NNM2, the first linear regression model LRM1, the second linear regression model LRM2, and the third linear regression model LRM3, respectively, where those parameters may be an average according to the training history, a set of predetermined values, or random values.

Further embodiments are given to describe how to train neural network models and linear regression models according to transformations of a top view image and a side view image corresponding to the fabric, and the pre-measured physical deformation parameter corresponding to the fabric.

Figure 2:
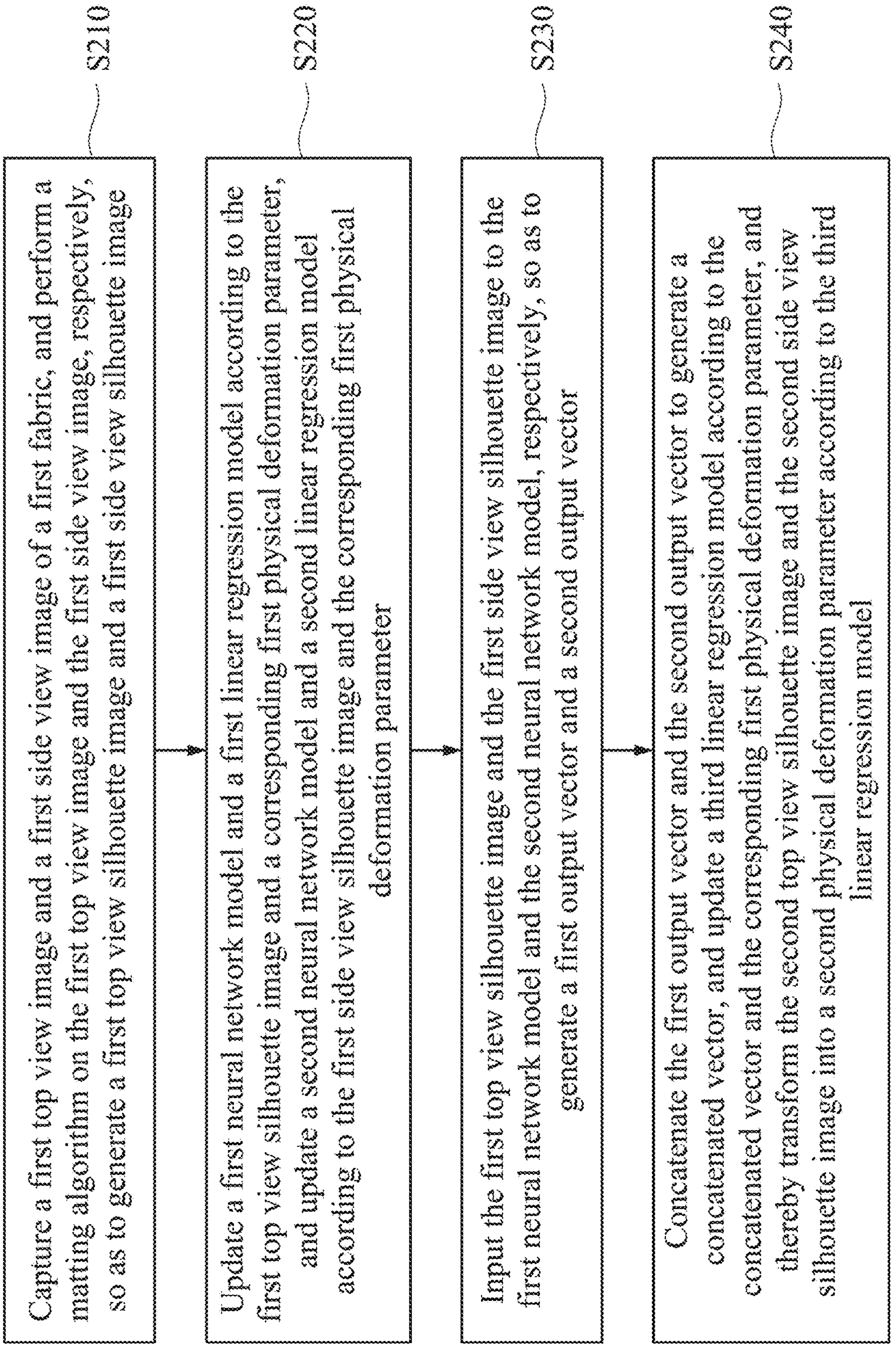
FIG. 2 is a flowchart of a fabric image processing method according to some embodiments of the present disclosure.

Refer also to FIG. 2, where FIG. 2 is a flowchart of a fabric image processing method according to some embodiments of the present disclosure. The components in the fabric image processing device 100 of FIG. 1B are configured to execute Steps S210-S240 of the fabric image processing method. As shown in FIG. 2, at first, in step S210, a first top view image and a first side view image of a first fabric (a fabric being used in the training stage is hereinafter referred to as the first fabric) are captured, and then perform a matting algorithm on the first top view image and the first side view image respectively, so as to generate a first top view silhouette image and a first side view silhouette image.

In some embodiments, the image capturing circuit 110 may shoot the first fabric through a side view and a top view to generate the first top view image and the first side view image, respectively. In some embodiments, the matting algorithm may be a clustering algorithm (e.g., a k-means algorithm) or other algorithms configured to recognize edges of objects. In some embodiments, the image capturing circuit 110 may shoot images of the first fabric put in a green screen scene or other scenes through the side view and the top view, so as to generate the first top view image and the first side view image, respectively. In some embodiments, the processor 130 perform image background removal and cutting (removing a part of background) on the first top view image and the first side view image (e.g., with a size of 4232×3204 pixels) through the matting algorithm, so as to generate the first top view silhouette image and the first side view silhouette image (e.g., with a size of 224×224 pixels), where the first top view silhouette image and the first side view silhouette image may both be black and white images, where the white region of a black and white image may be an object region of the first fabric, and the black region of the black and white image may be a background region.

Figure 3A:
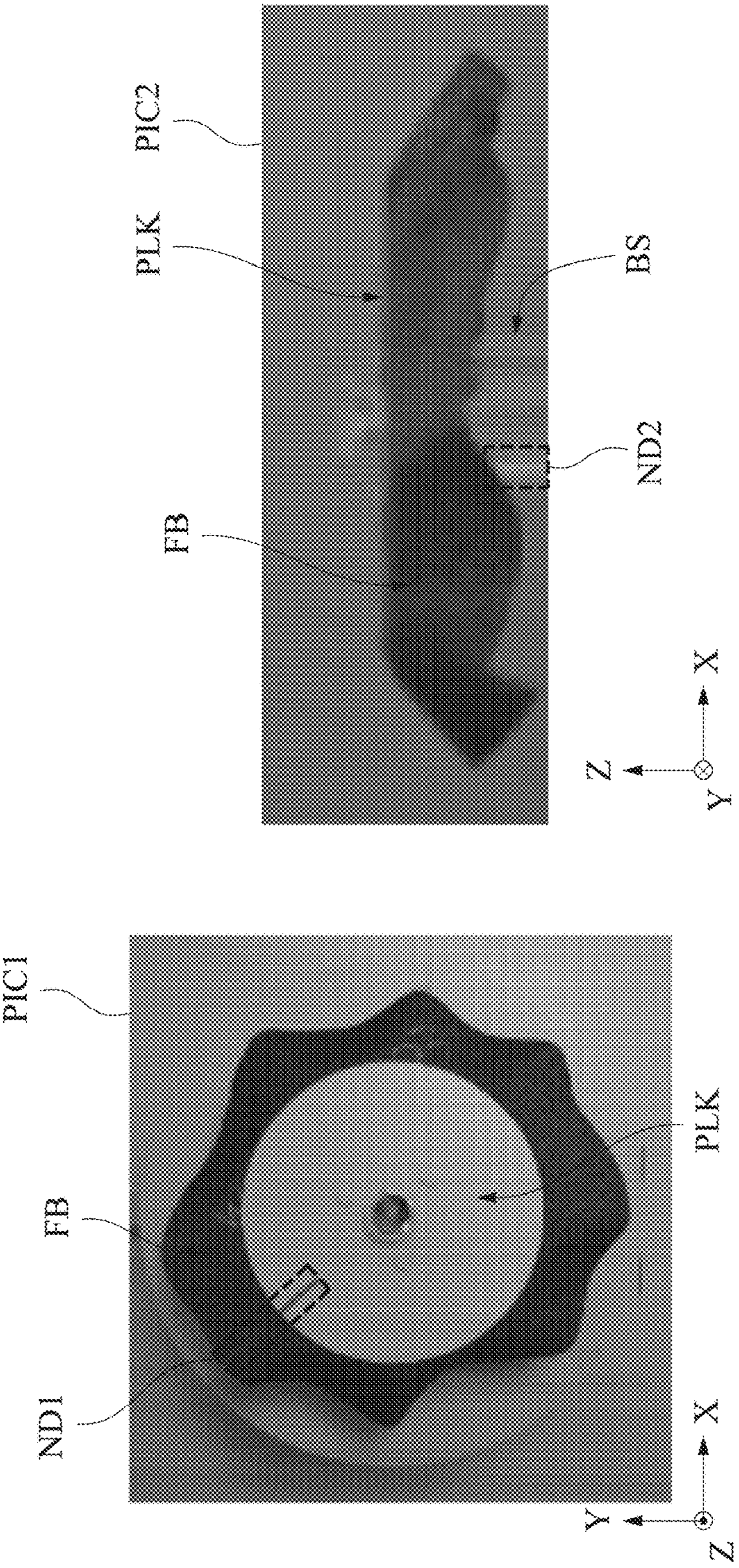
FIG. 3A depicts schematic diagrams of a first top view image and a first side view image shot according to some embodiments of the present disclosure.

In the following paragraphs, practical examples are given to describe the first top view image, the first side view image, the first top view silhouette image, and the first side view silhouette image. Refer also to FIG. 3A, where FIG. 3A depicts schematic diagrams of the first top view image PIC1 and the first side view image PIC2 shot according to some embodiments of the present disclosure. As shown in FIG. 3A, the first top view image PIC1 and the first side view image PIC2 are images of first fabric FB shot in the green screen scene. The first top view image PIC1 is a top view image shot along the −Z-direction of the green screen scene, and the first side view image PIC2 is a side view image shot along the Y-direction of the green screen scene.

In the first top view image PIC1, a disk PLK may be placed above the first fabric FB (along the Z-direction), and a needle ND1 may be set along the horizontal direction (along the XY plane) above the first fabric FB and the disk PLK. In the first side view image PIC2, the first fabric FB may be placed on the bracket BS (the first fabric FB may drape on the bracket BS, and the disk PLK is configured to hold the non-draping part of the first fabric FB), while a needle ND2 may be set along the vertical direction (along the Z-direction) below the first fabric FB. In addition, the needle ND1 may be parallel to the weft direction of the fiber of the first fabric FB, while the needle ND2 may be parallel to the warp direction of the fiber of the first fabric FB. In other words, the needle D1 may indicate the weft direction of the first fabric FB, while the needle ND2 may indicate the warp direction of the first fabric FB.

Figure 3B:
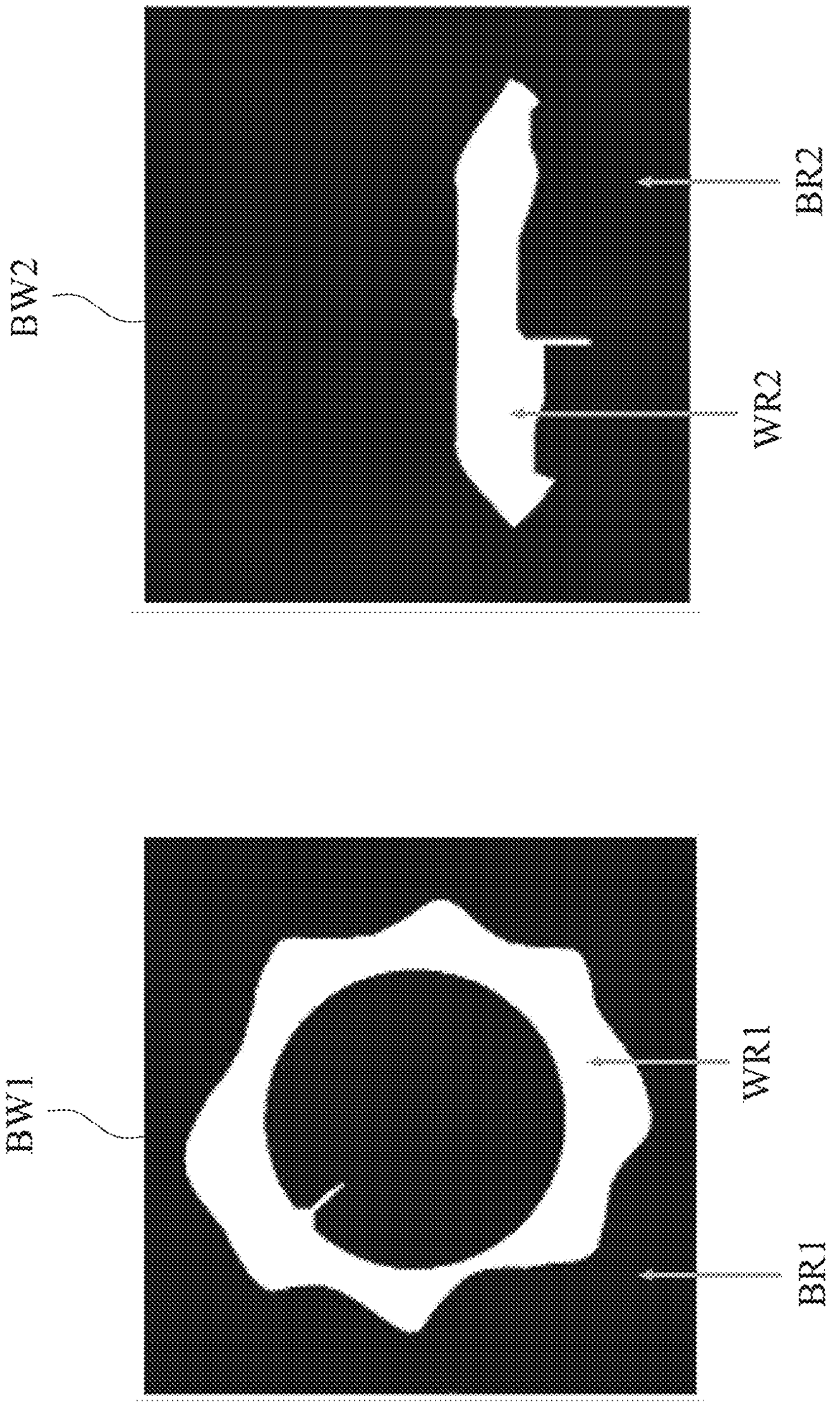
FIG. 3B depicts schematic diagrams of a first top view silhouette image and a first side view silhouette image generated according to some embodiments of the present disclosure.

Refer also to FIG. 3B, where FIG. 3B depicts schematic diagrams of a first top view silhouette image BW1 and a first side view silhouette image BW2 generated according to some embodiments of the present disclosure. As shown in FIG. 3B, where the first top view silhouette image BW1 and the first side view silhouette image BW2 generated from the first top view image PIC1 and first side view image PIC2 of FIG. 3A are both black and white images. In the first top view silhouette image BW1, a white region WR1 is the object region of the first fabric FB, and a black region BR1 is the background region. In first side view silhouette image BW2, a white region WR2 is the object region of the first fabric FB, and a black region BR2 is the background region.

Moreover, as shown in FIG. 2, in Step S220, the first neural network model NNM1 and the first linear regression model LRM1 are updated according to the first top view silhouette image and a corresponding first physical deformation parameter (the physical deformation parameter corresponding to the first fabric is hereinafter referred to as the first physical deformation parameter), and the second neural network model NNM2 and the second linear regression model LRM2 are updated according to the first side view silhouette image and the corresponding first physical deformation parameter. In some embodiments, the first neural network model NNM1 may be concatenated before the first linear regression model LRM1, and the second neural network model NNM2 may be concatenated before the second linear regression model LRM2.

In some embodiments, the processor 130 may take the first top view silhouette image and the first physical deformation parameter as a training sample and a training label, respectively, and then use the training sample and the training label to update parameters of the first neural network model NNM1 and the first linear regression model LRM1. In some embodiments, the processor 130 may update parameters of the first neural network model NNM1 and the first linear regression model LRM1 through the backpropagation algorithm according to the training sample and the training label.

Figure 4A:
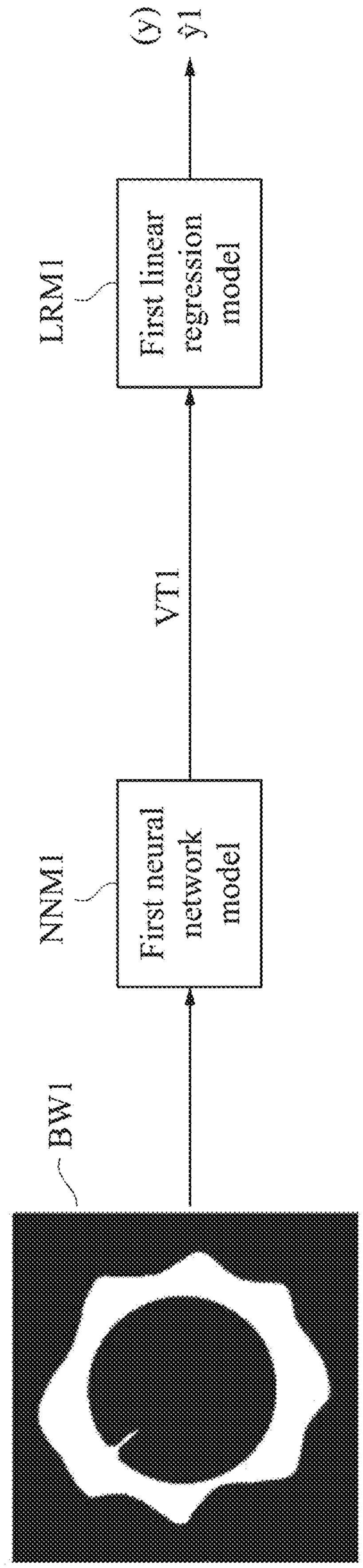
FIG. 4A is a schematic diagram of a training stage of a first neural network model and a first linear regression model according to some embodiments of the present disclosure.

In the following paragraphs, practical examples are given to describe the updating process of the first neural network model NNM1 and the first linear regression model LRM1. Refer also to FIG. 4A, where FIG. 4A is a schematic diagram of the training stage of the first neural network model NNM1 and the first linear regression model LRM1 according to some embodiments of the present disclosure. As shown in FIG. 4A, where the first neural network model NNM1 and the first linear regression model LRM1 may be connected to each other. Then, the first top view silhouette image BW1 may be taken as the training example, and the first physical deformation parameter y may be taken as the training label. Then, the first top view silhouette image BW1 may be inputted to the first neural network model NNM1 to generate an output vector VT1, and then the output vector VT1 may be inputted to the first linear regression model LRM1 to generate an output result ŷ1.

Finally, a loss (e.g., a mean-squared error (MSE)) may be calculated according to the first physical deformation parameter y and the output result ŷ1, and the loss value may be used in the backpropagation algorithm, so as to update parameters of the first neural network model NNM1 and the first linear regression model LRM1. It is worth mentioning that to simplify the description, the first top view silhouette image BW1 and the first physical deformation parameter y of a first fabric are taken as an example therein. However, in practical implementations, a large number of top view silhouette images and physical deformation parameters of a large number of fabrics are used to train the first neural network model NNM1 and the first linear regression model LRM1 using the same method.

In some embodiments, the processor 130 may take the first side view silhouette image and the corresponding first physical deformation parameter as a training sample and a training label, respectively, and then use the training sample and the training label to update parameters of the second neural network model NNM2 and the second linear regression model LRM2. In some embodiments, the processor 130 may update parameters of the second neural network model NNM2 and the second linear regression model LRM2 through the backpropagation algorithm according to the training sample and the training label.

Figure 4B:
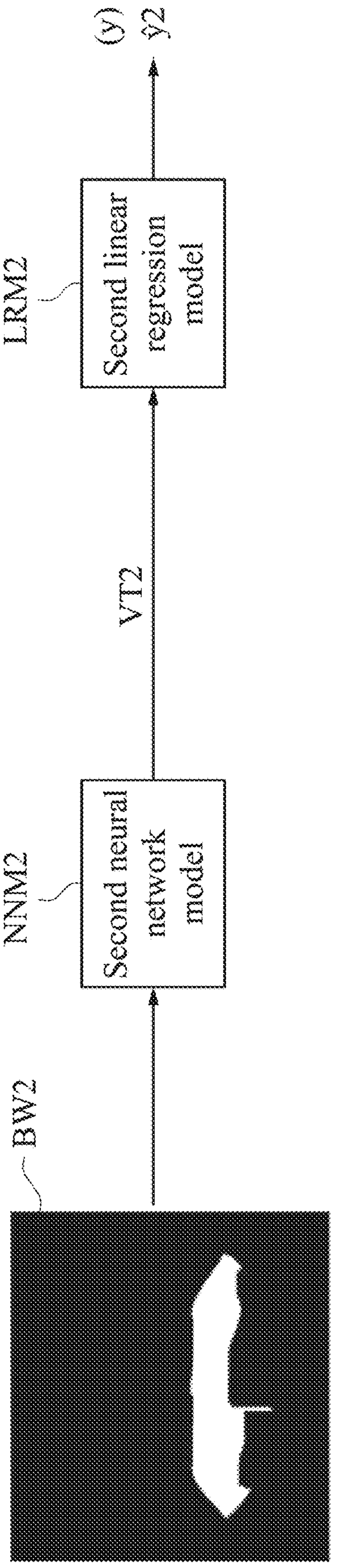
FIG. 4B is a schematic diagram of a training stage of a second neural network model and a second linear regression model according to some embodiments of the present disclosure.

In the following paragraphs, practical examples are given to describe the updating process of the second neural network model NNM2 and the second linear regression model LRM2. Refer also to FIG. 4B, where FIG. 4B is a schematic diagram of the training stage of the second neural network model NNM2 and the second linear regression model LRM2 according to some embodiments of the present disclosure. As shown in FIG. 4B, where the second neural network model NNM2 and the second linear regression model LRM2 may be connected to each other. Then, the first side view silhouette image BW2 may be taken as the training example, while the first physical deformation parameter y may be taken as the training label. Then, the first side view silhouette image BW2 may be inputted to the first neural network model NNM1 to generate an output vector VT2, and then the output vector VT2 may be inputted to the second linear regression model LRM2 to generate an output result ŷ2.

Finally, a loss (e.g., a mean-squared error (MSE)) may be calculated according to the first physical deformation parameter y and the output result ŷ2, and the loss value may be used in the backpropagation algorithm, so as to update parameters of the neural network model NNM2 and the second linear regression model LRM2. It is worth mentioning that to simplify the description, the first side view silhouette image BW2 and the first physical deformation parameter y of a first fabric are taken as an example therein. However, in practical implementations, a large number of side view silhouette images and physical deformation parameters of a large number of fabrics are used to train the first neural network model NNM1 and the first linear regression model LRM1 using the same method.

Moreover, as shown in FIG. 2, in Step S230, the first top view silhouette image and the first side view silhouette image are inputted to the first neural network model NNM1 and the second neural network model NNM2, respectively, so as to generate a first output vector and a second output vector. In other words, as the training of the first neural network model NNM1 and the second neural network model NNM2 is finished, the first top view silhouette image and the first side view silhouette image may be inputted to the well-trained first neural network model NNM1 and the well-trained second neural network model NNM2 again, so as to generate the first output vector and the second output vector.

Moreover, in Step S240, the first output vector and the second output vector are concatenated to generate a concatenated vector, and the third linear regression model is updated according to the concatenated vector and the corresponding first physical deformation parameter. In some embodiments, the third linear regression model LRM3 may be concatenated after the first neural network model NNM1 and the second neural network model NNM2.

In some embodiments, the processor 130 may concatenate the first output vector and the second output vector sequentially to generate the concatenated vector. In some embodiments, the processor 130 may take the concatenated vector and the corresponding first physical deformation parameter as a training sample and a training label, respectively, and then use the training sample and the training label to update parameters of the third linear regression model LRM3. In some embodiments, the processor 130 may update parameters of the third linear regression model LRM3 through the backpropagation algorithm according to the training sample and the training label.

Figure 4C:
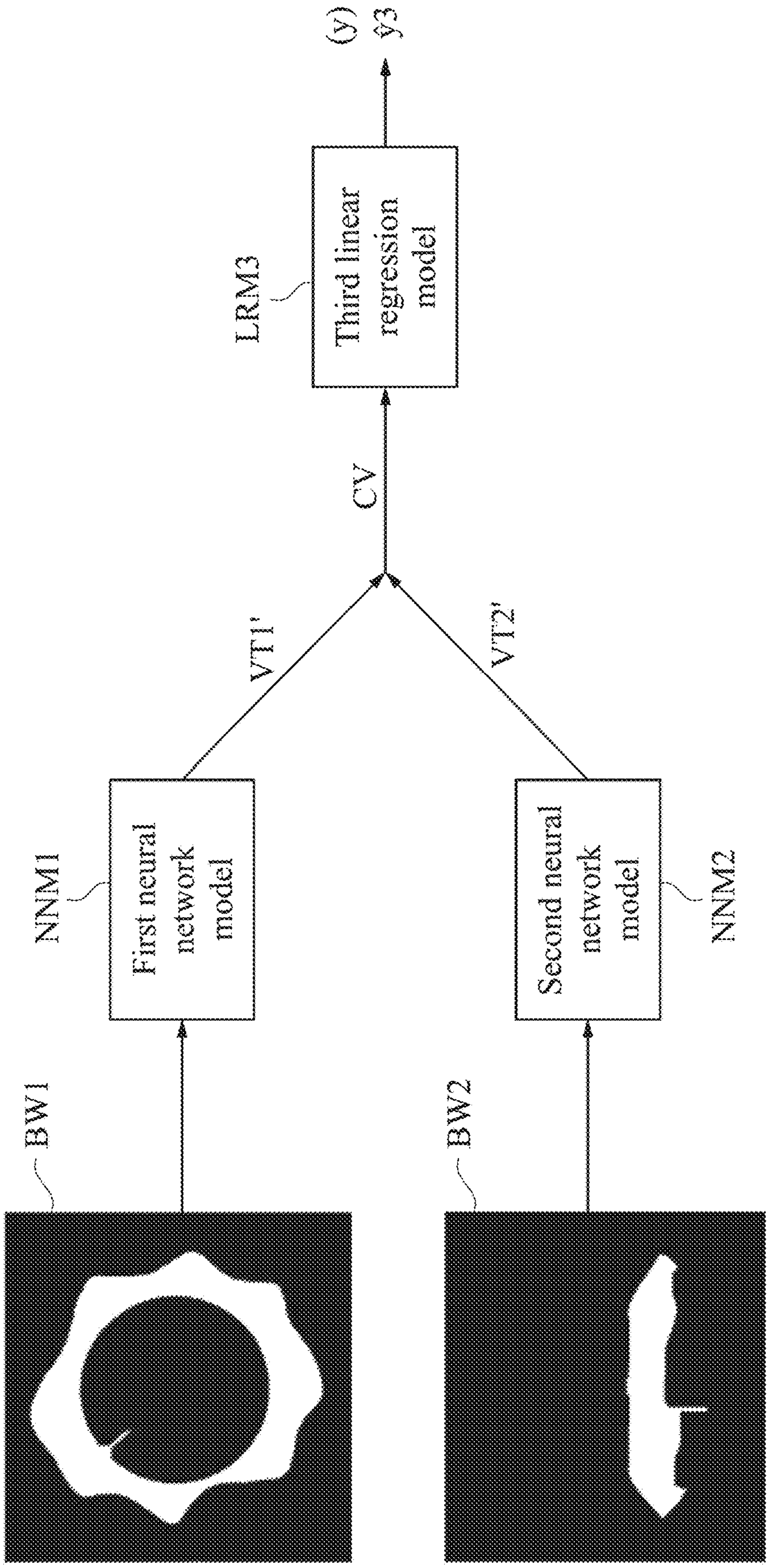
FIG. 4C is a schematic diagram of a training stage of a third linear regression model according to some embodiments of the present disclosure.

In the following paragraphs, practical examples are given to describe the updating process of the third linear regression model LRM3. Refer also to FIG. 4C, where FIG. 4C is a schematic diagram of the training stage of the third linear regression model LRM3 according to some embodiments of the present disclosure. As shown in FIG. 4C, where the first neural network model NNM1 and the second neural network model NNM2 may be connected to the third linear regression model LRM3 simultaneously. Then, the first top view silhouette image BW1 and the first side view silhouette image BW2 may be taken as the training example, and the first physical deformation parameter y may be taken as the training label. Then, the first top view silhouette image BW1 and the first side view silhouette image BW2 may be inputted to the first neural network model NNM1 and the second neural network model NNM2, respectively, so as to generate an output vector VT1' and an output vector VT2', and then the output vector VT1' is concatenated with the output vector VT2' sequentially to generate a concatenated vector CV.

Finally, the concatenated vector CV may be inputted to the third linear regression model LRM3 to generate an output result ŷ3, and a loss may be calculated according to the first physical deformation parameter y and the output result ŷ3, and the loss value may be used in the backpropagation algorithm, so as to update parameters of the third linear regression model LRM3. It is worth mentioning that to simplify the description, the first top view silhouette image BW1, the first side view silhouette image BW2, and the first physical deformation parameter y of a first fabric are taken as an example therein. However, in practical implementations, a large number of top view silhouette images, side view silhouette images, and physical deformation parameters of a large number of fabrics are used to train the third linear regression model LRM3.

In some embodiments, the processor 130 may generate another concatenated vector according to a fabric specification information corresponding to the first fabric, and then concatenate another concatenated vector with the concatenated vector to generate a new concatenated vector. Then, the processor 130 may use the new concatenated vector and the first physical deformation parameter to further update parameters of the third linear regression model LRM3. In some embodiments, the fabric specification information comprises a fabric category data, a fabric combination data, and a fabric weight data.

In some embodiments, the fabric category data comprises a weaving category, an elastic category, and a fabric type. For example, the weaving category may be one of various weaving specifications such as warp knit, weft knit, plain weave, or twill weave. The elastic category may be one of various elastic specifications such as non-elastic, 4-way elastic, warp elastic, weft elastic. The fabric category may be a fabric specification such as dobby, single jersey fleece/plush, tricot fleece/tricot brush or lamination. In other words, each of the weaving category, the elastic category and the fabric category is a string.

In some embodiments, the fabric combination data may include a composition combination and a textile-finishing combination. For example, the composition combination may be a fiber composition specification such as 60% nylon fiber and 40% polyester fiber, 92% polyester fiber and 8% spandex fiber, 50% cationic (cd) polyester fiber and 50% polyester fiber or 77% nylon fiber and 23% polyurethane (pu). The textile-finishing may be unfinished, brush with embossing or brush. In other words, each of the composition combination and the textile-finishing combination is a string including a plurality of strings, respectively.

In some embodiments, the fabric weight data may include a fabric weight and a specific gravity, where the unit of the fabric weight is GSM, and the fabric weight is a ratio between two densities. In other words, each of the fabric weight and the specific gravity is a numerical data, respectively.

In some embodiments, the processor 130 may transform the fabric category data into a first vector through a target-encoding algorithm and normalization, transform the fabric combination data into a second vector through a bidirectional encoder representations from transformers (BERT) algorithm and a principal component analysis (PCA) algorithm, and transform the fabric into a third vector through normalization. Then, the processor 130 may concatenate the first vector, the second vector, and the third vector to generate another concatenated vector.

It is worth mentioning that although only one physical deformation parameter is taken as an example, in practical implementations, different first neural network models NNM1, second neural network models NNM2, first linear regression models LRM1, second linear regression models LRM2, and third linear regression models LRM3 may be trained for different physical deformation parameters.

The training stage of the first neural network model NNM1, the second neural network model NNM2, the first linear regression model LRM1, the second linear regression model LRM2, and the third linear regression model LRM3 may be completed following the aforementioned steps. By this, the well-trained first neural network model NNM1, second neural network model NNM2, and third linear regression model LRM3 may be utilized to conduct the measurement of the physical deformation parameter.

In the following paragraphs, the executing stage of the first neural network model NNM1, the second neural network model NNM2, and the third linear regression model LRM3 will be described.

In some embodiments, the image capturing circuit 110 may capture a second top view image and a second side view image corresponding to a second fabric (the new fabric is hereinafter referred to as the second fabric) again (i.e., to shoot images of a new fabric), and the processor 130 may perform a matting algorithm on the second top view image and the second side view image respectively, so as to generate a second top view silhouette image and a second side view silhouette image.

In some embodiments, processor 130 may transform the second top view silhouette image and the second side view silhouette image corresponding to the second fabric into a second physical deformation parameter (i.e., the measured physical deformation parameter) through the first neural network model NNM1, the second neural network model NNM2, and the third linear regression model LRM3.

In the following paragraphs, practical examples will be given to describe the executing stage of the first neural network model NNM1, the second neural network model NNM2, and the third linear regression model LRM3.

Figure 5:
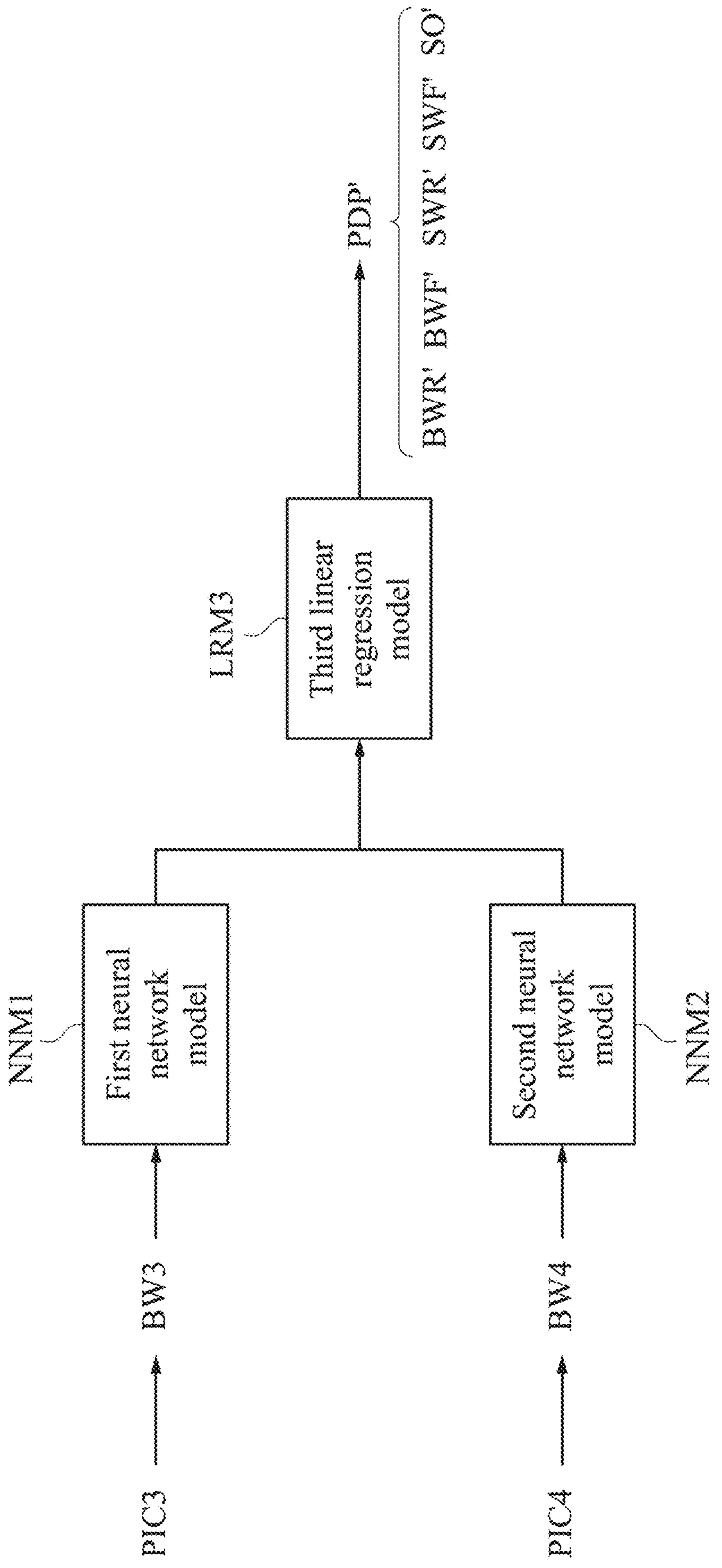
FIG. 5 is a schematic diagram of the executing stage of the first neural network model, the second neural network model, and the third linear regression model according to some embodiments of the present disclosure.

Refer also to FIG. 5, where is a schematic diagram of the executing stage of the first neural network model NM1, the second neural network model NM2, and the third linear regression model LRM3 according to some embodiments of the present disclosure. As shown in FIG. 5, the matting algorithm may be performed on the second top view image PIC3 and the second side view image PIC4, respectively, so as to generate the second top view silhouette image BW3 and the second side view silhouette image BW4. Then, the second top view silhouette image BW3 and the second side view silhouette image BW4 may be inputted to the well-trained first neural network model NNM1 and second neural network model NNM2, respectively. By this, a second physical deformation parameter PDP' may be outputted from the well-trained third linear regression model LRM3, where the second physical deformation parameter PDP' may be a bending work in the warp direction BWR', the bending work in the weft direction BWF', a stretching rate in the warp direction SWR', a a stretching rate in the weft direction SWF', or a stretching rate in the oblique direction SO', etc.

By this, as the well-trained first neural network model NNM1, second neural network model NNM2, and third linear regression model LRM3 are used, the second physical deformation parameter PDP' corresponding to the second fabric may be easily measured through the second top view silhouette image BW3 and the second side view silhouette image BW4. Therefore, as the well-trained first neural network model NNM1, second neural network model NNM2, and third linear regression model LRM3 are used, the complicated measurement procedure may be omitted, and the cost of measurement may be reduced. As a result, since the physical deformation parameter may be easily obtained, the procedure of using a simulation display SD in FIG. 1A to display various drapes and motions of a virtual fabric 3DF in the virtual three-dimensional space 3DS may be more easily to be conducted.

In summary, the fabric image processing device according to the present disclosure utilizes a combination of two neural network models and three linear regression models to construct a model for prediction of physical deformation parameter through a training procedure using silhouette image of fabrics. By this, as new silhouette images corresponding to a new fabric are inputted to the two well-trained neural network models and one of the linear regression models, a new physical deformation parameter may be generated to perform simulations. As a result, various drapes and motions of a virtual fabric may be simulated in a three-dimensional virtual space without measuring various deformations of the new fabric (which is more difficult to obtain), which may reduce the time and manpower consumed by additional measurement of physical deformation parameters, and thereby improve the efficiency of fabric simulation in the three-dimensional virtual space.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A fabric image processing device, comprising:

an image capturing circuit, configured to capture a first top view image and a first side view image of a first fabric;

a memory, configured to store a first physical deformation parameter corresponding to the first fabric; and a processor, coupled to the image capturing circuit and the memory, configured to execute a first neural network model, a second neural network model, a first linear regression model, a second linear regression model, and a third linear regression model, wherein the processor is configured to execute the following operations:

performing a matting algorithm on the first top view image and the first side view image respectively to generate a first top view silhouette image and a first side view silhouette image;

updating the first neural network model and the first linear regression model according to the first top view silhouette image and the corresponding first physical deformation parameter, and updating the second neural network model and the second linear regression model according to the first side view silhouette image and the corresponding first physical deformation parameter;

inputting the first top view silhouette image and the first side view silhouette image to the first neural network model and the second neural network model respectively to generate a first output vector and a second output vector; and concatenating the first output vector and the second output vector to generate a concatenated vector, and updating the third linear regression model according to the concatenated vector and the corresponding first physical deformation parameter.

2. The fabric image processing device of claim 1, wherein the first neural network model is concatenated before the first linear regression model.

3. The fabric image processing device of claim 2, wherein the step of updating the first neural network model and the first linear regression model according to the first top view silhouette image and the corresponding first physical deformation parameter comprises:

taking the first top view silhouette image and the first physical deformation parameter as a training sample and a training label, respectively, and utilizing the training sample and the training label to update a plurality of parameters of the first neural network model and the first linear regression model.

4. The fabric image processing device of claim 1, wherein the second neural network model is concatenated before the second linear regression model.

5. The fabric image processing device of claim 4, wherein the step of updating the second neural network model and the second linear regression model according to the first side view silhouette image and the corresponding first physical deformation parameter comprises:

taking the first side view silhouette image and the corresponding first physical deformation parameter as a training sample and a training label, respectively, and utilizing the training sample and the training label to update a plurality of parameters of the second neural network model and the second linear regression model.

6. The fabric image processing device of claim 1, wherein the third linear regression model is concatenated after the first neural network model and the second neural network model simultaneously.

7. The fabric image processing device of claim 6, wherein the step of updating the third linear regression model according to the concatenated vector and the corresponding first physical deformation parameter comprises:

taking the concatenated vector and the corresponding first physical deformation parameter as a training sample and a training label, respectively, and utilizing the training sample and the training label to update a plurality of parameters of the third linear regression model.

8. The fabric image processing device of claim 1, wherein, the image capturing circuit captures a second top view image and a second side view image corresponding to a second fabric, the processor performs a matting algorithm on the second top view image and the second side view image respectively to generate a second top view silhouette image and a second side view silhouette image, and the processor transforms the second top view silhouette image and the second side view silhouette image into a second physical deformation parameter according to an updated first neural network model, an updated second neural network model and an updated third linear regression model.

9. The fabric image processing device of claim 1, wherein the first neural network model and the second neural network model are configured to perform a convolutional neural network algorithm, respectively.

10. The fabric image processing device of claim 1, wherein the first physical deformation parameter is obtained by measuring the first fabric.

11. A fabric image processing method, comprising:

capturing a first top view image and a first side view image of a first fabric, and performing a matting algorithm on the first top view image and the first side view image respectively to generate a first top view silhouette image and a first side view silhouette image;

updating a first neural network model and a first linear regression model according to the first top view silhouette image and a corresponding first physical deformation parameter, and updating a second neural network model and a second linear regression model according to the first side view silhouette image and the corresponding first physical deformation parameter;

inputting the first top view silhouette image and the first side view silhouette image to the first neural network model and the second neural network model respectively to generate a first output vector and a second output vector; and concatenating the first output vector and the second output vector to generate a concatenated vector, and updating a third linear regression model according to the concatenated vector and the corresponding first physical deformation parameter.

12. The fabric image processing method of claim 11, wherein the first neural network model is concatenated before the first linear regression model.

13. The fabric image processing method of claim 12, wherein the step of updating the first neural network model and the first linear regression model according to the first top view silhouette image and the corresponding first physical deformation parameter comprises:

taking the first top view silhouette image and the corresponding first physical deformation parameter as a training sample and a training label, respectively, and utilizing the training sample and the training label to update a plurality of parameters of the first neural network model and the first linear regression model.

14. The fabric image processing method of claim 11, wherein the second neural network model is concatenated before the second linear regression model.

15. The fabric image processing method of claim 14, wherein the step of updating the second neural network model and the second linear regression model according to the first side view silhouette image and the corresponding first physical deformation parameter comprises:

taking the first side view silhouette image and the corresponding first physical deformation parameter as a training sample and a training label, respectively, and utilizing the training sample and the training label to update a plurality of parameters of the second neural network model and the second linear regression model.

16. The fabric image processing method of claim 11, wherein the third linear regression model is concatenated after the first neural network model and the second neural network model simultaneously.

17. The fabric image processing method of claim 16, wherein the step of updating the third linear regression model according to the concatenated vector and the corresponding first physical deformation parameter comprises:

taking the concatenated vector and the corresponding first physical deformation parameter as a training sample and a training label, respectively, and utilizing the training sample and the training label to update a plurality of parameters of the third linear regression model.

18. The fabric image processing method of claim 11, further comprising:

capturing a second top view image and a second side view image corresponding to a second fabric, performing a matting algorithm on the second top view image and the second side view image respectively to generate a second top view silhouette image and a second side view silhouette image, and transforming the second top view silhouette image and the second side view silhouette image into a second physical deformation parameter according to an updated first neural network model, an updated second neural network model and an updated third linear regression model.

19. The fabric image processing method of claim 11, wherein the first neural network model and the second neural network model are configured to perform a convolutional neural network algorithm, respectively.

20. The fabric image processing method of claim 11, wherein the corresponding first physical deformation parameter is obtained by measuring the first fabric.

* * * * *